United States Patent
Gillis et al.

(10) Patent No.: US 6,501,624 B1
(45) Date of Patent: Dec. 31, 2002

(54) MULTIPLE ZONE DATA STORAGE SYSTEM AND METHOD

(75) Inventors: Donald Ray Gillis; David H. Jen, both of San Jose; Mike Suk, Milpitas, all of CA (US)

(73) Assignee: International Business Machines Corporation, Armonk, NJ (US)

( * ) Notice: Subject to any disclaimer, the term of this patent is extended or adjusted under 35 U.S.C. 154(b) by 0 days.

(21) Appl. No.: 08/802,469

(22) Filed: Feb. 19, 1997

Related U.S. Application Data

(62) Division of application No. 08/571,666, filed on Dec. 13, 1995, now Pat. No. 5,798,884.

(51) Int. Cl.⁷ ................................................ G11B 5/54
(52) U.S. Cl. .................................................. 360/256.3
(58) Field of Search ................................ 360/104–106, 360/256, 256.1, 256.3

(56) References Cited

U.S. PATENT DOCUMENTS

| | | | |
|---|---|---|---|
| 4,562,500 A | 12/1985 | Bygdnes ..................... | 360/105 |
| 4,833,550 A | 5/1989 | Takizawa et al. ............. | 360/75 |
| 4,907,106 A | 3/1990 | Yamada ....................... | 360/75 |
| 5,023,736 A | 6/1991 | Kelsic et al. | |
| 5,062,021 A | 10/1991 | Ranjan et al. ............... | 360/135 |
| 5,095,395 A | 3/1992 | Wakatsuki ................... | 360/105 |
| 5,117,318 A | 5/1992 | Immier et al. .............. | 360/105 |
| 5,166,006 A | 11/1992 | Lal et al. .................... | 428/612 |
| 5,363,261 A | 11/1994 | Eckberg et al. ............. | 360/105 |
| 5,381,290 A * | 1/1995 | Cheng ......................... | 360/105 |
| 5,446,606 A | 8/1995 | Brunner et al. .............. | 360/75 |
| 5,555,146 A * | 9/1996 | Hickox et al. .............. | 360/105 |
| 5,636,090 A * | 6/1997 | Boigenzahn et al. ........ | 360/105 |

FOREIGN PATENT DOCUMENTS

| | | | | |
|---|---|---|---|---|
| EP | 579-399 | 6/1993 | | |
| EP | 583-989 | 8/1993 | | |
| EP | 625-778 | 5/1994 | | |
| GB | 2170346 | * 7/1986 | ................ | 360/105 |
| GB | 2170359 | * 7/1986 | ................ | 360/105 |
| JP | 1-166385 | 12/1987 | | |
| JP | 01166385 A2 | 12/1987 | | |
| JP | 02146109 A2 | 11/1988 | | |
| JP | 1-241070 | 9/1989 | | |
| JP | 2-73581 | 3/1990 | | |
| JP | 04011324 A2 | 4/1990 | | |
| JP | 2-146109 | 6/1990 | | |
| JP | 2-193375 | * 7/1990 | ................ | 360/105 |
| JP | 04251436 A2 | 1/1991 | | |

(List continued on next page.)

OTHER PUBLICATIONS

IBM TDB vol. 28, No. 1, "Disk With Unlubricated Parking Zone" Jun. 1985 by D.W. Albrecht.

*Primary Examiner*—Allen Cao
(74) *Attorney, Agent, or Firm*—G. Marlin Knight; Robert B. Martin; Lewis L. Nunnelley

(57) ABSTRACT

A data storage system has a disk having a first, second and third zone. The first zone has rough texturing to prevent stiction between a slider at rest and the disk. The second zone has intermediate texturing to prevent stiction when a moving slider is in contact with the disk. The third zone has a smooth texture and is used for data recording. A control unit moves the slider between the zones as appropriate on power up and power down of the system. The system has an actuator latch having a bias device. The bias device allows the slider to be positioned between the first and second zones by selective energizing of the actuator while in the latched position.

12 Claims, 6 Drawing Sheets

FOREIGN PATENT DOCUMENTS

| | | |
|---|---|---|
| JP | 3-132980 | 6/1991 |
| JP | 05182385 A2 | 12/1991 |
| JP | 4-26969 | 1/1992 |
| JP | 06103563 A2 | 9/1992 |
| JP | 5-67380 * 3/1993 | .......... 360/105 |
| JP | 06259898 A2 | 11/1993 |
| JP | 07220414 A2 | 2/1994 |
| WO | WO93/21625 | 4/1992 |

* cited by examiner

MULTIPLE ZONE DATA STORAGE SYSTEM AND METHOD

This application is a divisional of Ser. No. 08/571,666 filed Dec. 13, 1995, now U.S. Pat. No. 5,798,884.

BACKGROUND OF THE INVENTION

1. Field of the Invention

This invention relates generally to magnetic recording disk data storage systems and more particularly to such systems having a plurality of surface zones.

2. Description of the Prior Art

Direct access storage devices (DASD), or disk drives, store information on concentric tracks of a rotatable magnetic recording disk. A magnetic head or transducer element is moved from track to track to record and read the desired information. Typically, the transducer element is positioned on an air bearing slider which flies above the surface of the disk as the disk rotates. In some recently proposed disk drives, the slider ("carrier") rides on a liquid film or bearing on the disk. A suspension assembly connects the slider to a rotary or linear actuator.

When the rotating magnetic disk of a disk drive is brought to a stopped condition, there is no aerodynamic cushion available to float or fly the slider above the surface. To prevent damage to the surface of the magnetic disk when it is not rotating, it is conventional to "park" the slider in a landing zone so that contact with the disk by the slider will not cause any significant damage and will not destroy magnetically recorded data. However, simply parking the slider does not address the possibility that the disk drive might be impacted by a force sufficient to dislodge the actuator from its parked position, and thus move the slider onto the recording surface of the magnetic disk. Accordingly, it is important that the actuator which positions the slider be restricted or otherwise held in its parked position to prevent any scratching of the data recording region of the disk surface by the slider when there is no aerodynamic bearing between them.

Extremely smooth surfaces exist on both the data surface and the air bearing face of the slider. Without the aerodynamic cushion between the slider and the disk surface, the slider will come into contact with the stationary disk surface and stiction may result. Stiction occurs as two very smooth surfaces stick to each other and effectively prevent the removal of one from the other. The stiction forces may be sufficient to prevent the rotation of the disk. However, even if the disk can be rotated, damage almost certainly will occur to the surface of the disk due to the fact that the slider is in physical contact with and is initially stuck to the disk surface as the disk moves relative to the slider.

The slider can be parked in a landing zone or on an unload device such as a ramp. The actuator which moves the slider must be latched to prevent movement of the slider out of the parked position onto the data recording region of the disk.

Examples of latching devices include U.S. Pat. No. 5,363,261 issued Nov. 8, 1994, by Eckberg et al.; U.S. Pat. No. 4,833,550 issued May 23, 1989, by Takizawa et al.; U.S. Pat. No. 5,446,606 issued Aug. 29, 1995, by Brunner et al.; U.S. Pat. No. 5,117,318 issued May 26, 1992, by Immler et al.; U.S. Pat. No. 5,095,395 issued Mar. 10, 1992, by Wakatsuki; U.S. Pat. No. 4,562,500 issued Dec. 31, 1985 by Bygbnes; Japanese Application J1-166385 published Jun. 30, 1989 by Morita; Japanese Application J2-73581 published Mar. 13, 1990 by Okutsu; Japanese Application J4-26969 published Jan. 30, 1992 by Tamayama; Japanese Application J3-132980 published Jun. 6, 1991 by Sasaki; Japanese Application J2-146109 published Jun. 5, 1990 by Kadowaki; and Japanese Application J1-241070 published Sep. 26, 1989 by Morita.

The landing zone area of the disk is roughly textured to prevent stiction between the disk and the slider when the slider is at rest on the disk. An example of this texturing process is shown in U.S. Pat. No. 5,062,021 issued Oct. 29, 1991, by Ranjan et al. Other examples of textured landing zones include U.S. Pat. No. 5,446,606 by Brunner et al issued Aug. 29, 1995, and U.S. Pat. No. 4,907,106 by Yamada issued Mar. 6, 1990, and IBM TDB Vol. 28, No. 1, June 1985, P. 318.

A problem with the textured landing zone is that the bumps of the texturing tend to wear down with use. This is due to the fact that the slider is still in contact with the disk surface for a time as the disk rotates before the slider becomes airborne. Also, when the disk is in the process of stopping, the slider is in contact with the landing zone for a time before the disk comes to a complete stop. AS the bumps become worn away, stiction between the slider and the disk is more likely and this can result in failure of the system. Another problem encountered with the texturing landing zone is that wear between the slider and the textured zone may damage the delicate transducer head. Both of these problems will become more critical in the future as the slider flying height above the disk continues to decrease.

SUMMARY OF THE INVENTION

Briefly, in a preferred embodiment of the present invention, a disk drive system comprises a recording disk, a spindle motor for rotating the disk, an actuator for positioning a transducer/slider over the disk surface, and a control device. The disk has a data zone, a takeoff/landing zone (T/LZ) and a parking zone (PZ). The parking zone has a rough textured surface which prevents stiction between the slider and the disk. The takeoff/landing zone has a lightly textured surface.

The control device controls the actuator and spindle motor. During power-up, the slider is initially at rest on the surface of the parking zone. The spindle motor starts to rotate the disk and immediately thereafter the slider is moved to the takeoff/landing zone. The slider remains in this zone until the spindle motor reaches operating speed and the slider is airborne. Then the slider is moved to the data zone for normal operation.

Upon power-down, the procedure is reversed. The slider is moved to the takeoff/landing zone, the spindle motor is powered off and the disk rotation starts to slow. The slider lands on the takeoff/landing zone, making contact with the disk as the disk slows even more. Just before the disk stops rotating entirely, the slider is moved to the parking zone.

A latch mechanism is used to hold the actuator such that the slider is limited to a location proximate both the takeoff/landing zone and the parking zone. A bias spring in the latch automatically forces the slider over the parking zone when no actuator force is applied. This provides protection that no stiction will occur even when an emergency power failure occurs.

For a fuller understanding of the nature and advantages of the present invention, reference should be made to the following detailed description taken in conjunction with the accompanying drawings.

DESCRIPTION OF THE PREFERRED EMBODIMENTS

Figure 1:
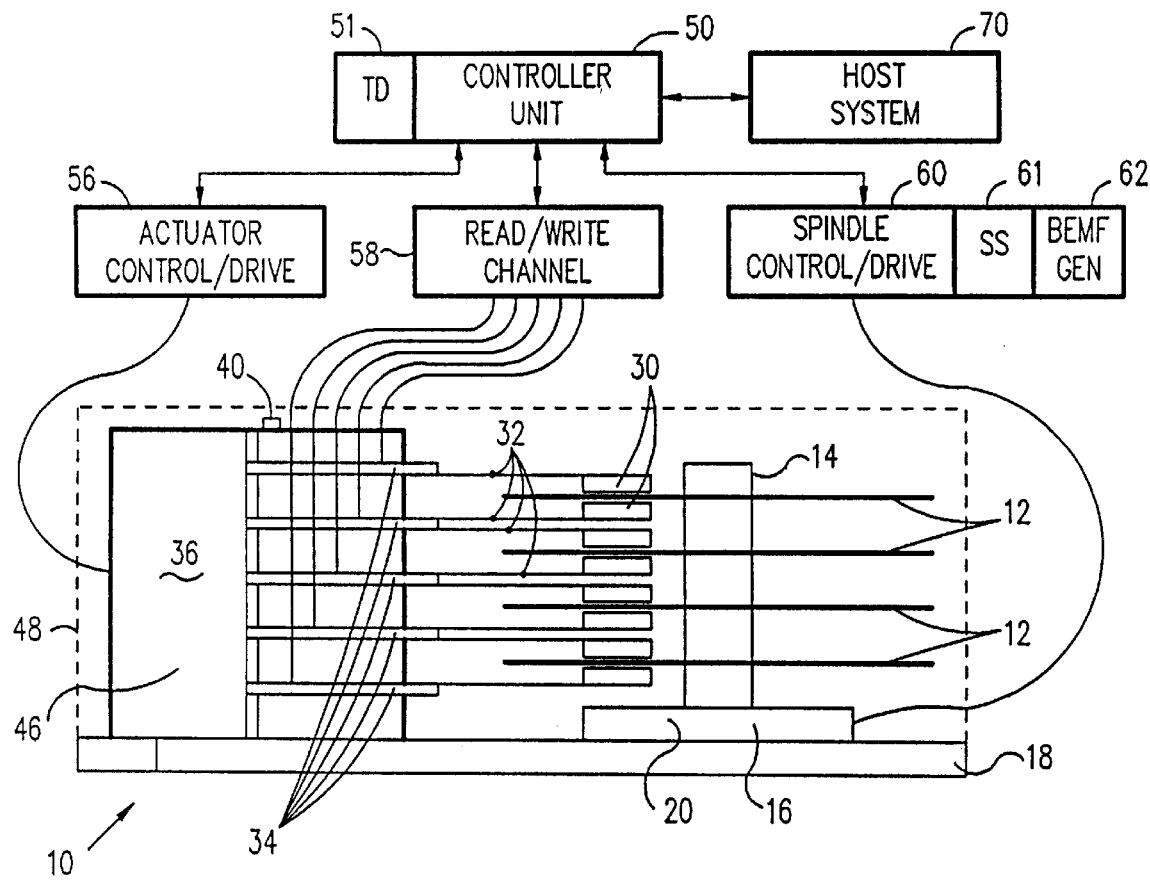
FIG. 1 is a schematic diagram of a data storage system of the present invention.

FIG. 1 shows a schematic diagram of a data storage system of the present invention and is designated by the general reference number 10. System 10 comprises a plurality of magnetic recording disks 12. Each disk 12 has a plurality of concentric data tracks. Disks 12 are mounted on a spindle shaft 14 which is connected to a spindle motor 16. Motor 16 is mounted to a chassis 18. The disks 12, spindle 14, and motor 16 comprise a disk stack assembly 20.

A plurality of sliders 30 (each having a transducer element) are positioned over the disks 12 such that each surface of the disks 12 have a corresponding slider 30. Each slider 30 is attached to one of a plurality of suspensions 32 which in turn are attached to a plurality of actuator arms 34. Arms 34 are connected to a rotary actuator 36. Alternatively, the arms 34 may be an integral part of a rotary actuator comb. Actuator 36 moves the sliders in a radial direction across disks 12. Actuator 36 pivots about an axis 40. The sliders 30, suspension 32, arms 34, and actuator 36 comprise an actuator assembly 46. The disk stack assembly 20 and the actuator assembly 46 are sealed in an enclosure housing 48 (shown by dashed line) which provides protection from particulate contamination.

A controller unit 50 provides overall control to system 10. Controller unit 50 typically contains a central processing unit (CPU), memory units, clocking devices, and other digital circuitry. Controller unit 50 also includes a timing device 51. Timing device 51 is preferably a logic clock device which are well known in the art. Controller unit 50 is connected to an actuator control/drive unit 56 which in turn is connected to actuator 36. This allows controller 50 to control the movement of sliders 30 over disks 12. The controller 50 is connected to a read/write channel 58 which in turn is connected to the transducer elements of sliders 30. This allows controller 50 to send and receive data from disks 12. Controller 50 is connected to a spindle control/drive unit 60 which in turn is connected to spindle motor 16. Spindle control/drive 60 contains a spindle speed sensor 61. Sensor 61 may be a Hall effect or back EMF sensor as are well known in the art. Controller 50 controls the rotation speed of disks 12.

Spindle control/drive 60 also contains a back EMF generator circuit 62. This circuit is used to generate energy from the rotating spindle motor in order to drive the actuator when the power has been interrupted. This is necessary in order to insure that even in a power interrupt situation, the actuator may be driven to a desired location to park the slider. These back EMF generators are well known in the disk drive industry.

A host system 70, which is typically a computer system, is connected to the controller unit 50. System 70 may send digital data to controller 50 to be stored on disks 12, or may request that digital data be read from disks 12 and sent to system 70. The basic operation of DASD units is well known in the art and is; described in more detail in Magnetic Recording Handbook, C. Dennis Mee and Eric D. Daniel, McGraw-Hill Book Company, 1990.

Figure 2:
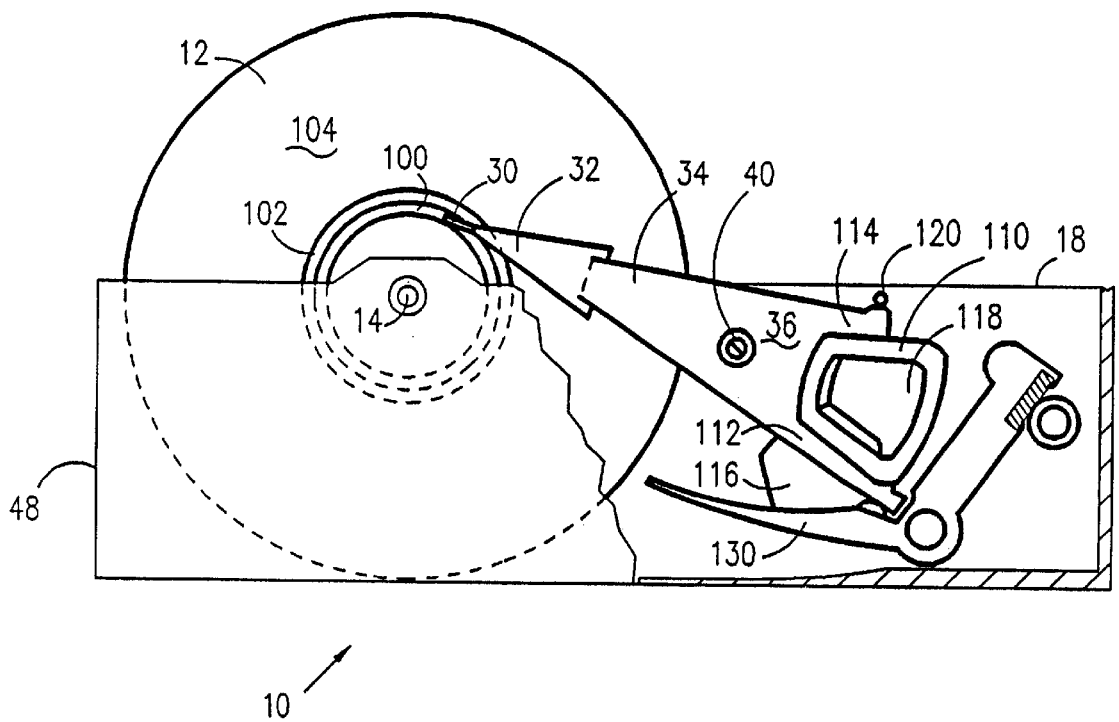
FIG. 2 is a cutaway top view of the system of FIG. 1 shown in a parked position.

FIG. 2 shows a top cutaway view of system 10. Disk 12 is comprised of three concentric ring shaped zones: a parking zone (PZ) 100, a takeoff/landing zone (T/LZ) 102 and a data zone 104. The parking zone 100 is located proximate the inner diameter of disk 12, the takeoff/landing zone 102 is located radially outward from parking zone 100, and the data zone 104 is located between the takeoff/landing zone and the outer diameter of disk. 12. The parking zone 100 has a rough textured surface, the takeoff/landing zone 102 has a lightly (intermediate) textured surface, and the data zone 104 has a smooth surface which is optimized for magnetic recording performance parameters, such as error rate and mechanical reliability. The data zone 104 contains the concentric data tracks which magnetically store digital information.

The actuator 36 is comprised of a voice coil motor coil 110 supported between two legs 112 and 114, and magnetic plates 116 and 118. Coil 110 interacts with the magnetic field created by magnets 116 and 118. When electrical current is passed through coil 110, the interaction between the magnetic field created by 110 and the magnetic field of magnets 116 and 118, causes the lateral movement of coil 110 and legs 112 and 114 of actuator 36 about axis 40. A cylindrical stop member 120 is attached to chassis 18 and abuts leg 114 when the actuator 36 is in a parked position. A latch member 130 engages actuator 36 to hold actuator 36 in the parked position.

Figure 3:
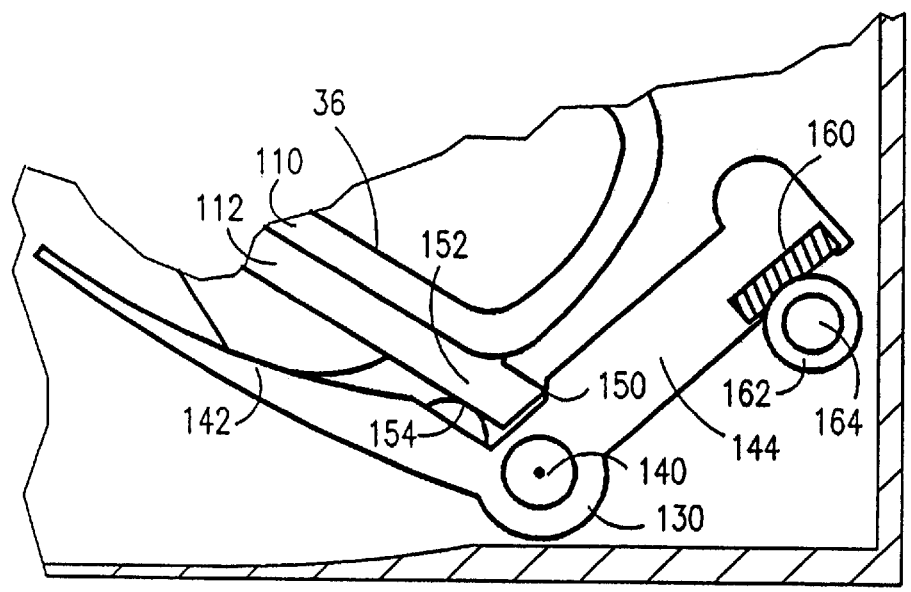
FIG. 3 is a closeup view of a latch portion of FIG. 2 in a parked position.

FIG. 3 shows a detailed view of latch 130. Latch 130 is pivotally mounted to chassis 18 along a pivot axis 140. Latch 130 has a first arm 142 and a second arm 144. Latch 130 has a recess 150 which receives a tab member 152 of actuator 36. A resilient bias device 154 is mounted within recess 150 on the side of recess 150 proximate first arm 142. The bias device is preferably a leafspring, however, other bias devices (such as other springs or compressible materials) may also be used. The bias device should be strong enough such that it is able to urge tab 152 against the side of recess 150 proximate second arm 144 when the actuator is not energized. The biased device needs to be strong enough to be able to completely push the slider into the parking zone 100, yet weak enough so that a minimum spindle motor speed provides enough back EMF from the back EMF generator 62 to power the actuator 36 to hold the slider in the takeoff/landing zone 102.

Second arm 144 has a metal plate 160 mounted into one side. Plate 160 contacts a rubber bumper 162 of a cylindrical magnetic post 164. Post 164 is attached to chassis 18.

Figure 4:
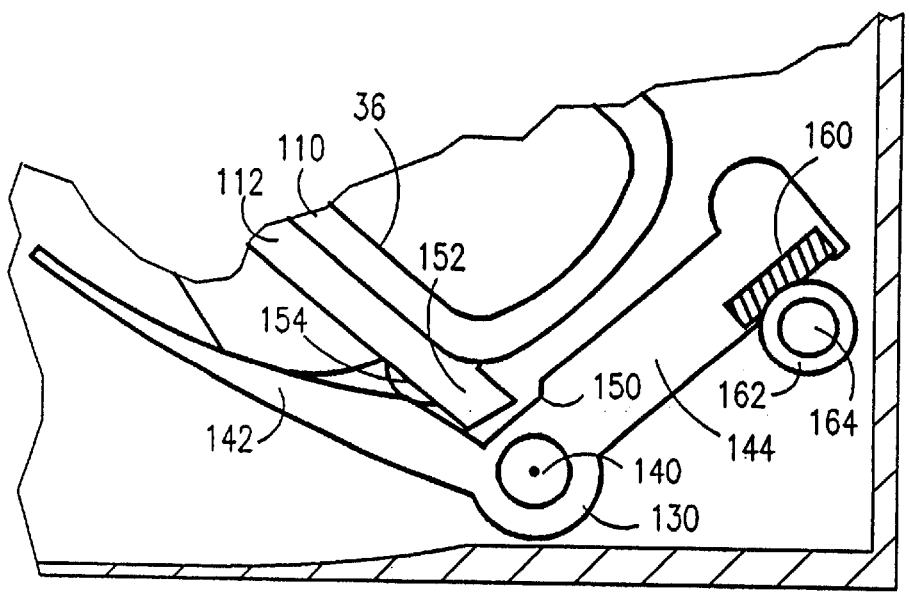
FIG. 4 is a closeup view of a latch portion of FIG. 2 in a takeoff/landing position.

FIGS. 2 and 3 show the actuator 36 in a parked position. The slider 30 is at rest on the parking zone 100 surface of disk 12. The tab 152 of actuator 36 is inserted in recess 150 of latch 130. The actuator motor 36 is not energized and the bias device 154 urges tab 152 against the side of recess 150 proximate the second arm 144. Plate 160 of arm 144 is magnetically attracted to magnet post 164 such that latch 130 will remain in its parked position with the actuator 36 firmly held in place. FIG. 4 shows a detailed view of latch 130 in a takeoff/landing position. The actuator 36 is energized and exerts a force against bias device 154 sufficient to displace the bias device 154 such that tab 152 moves toward the side of recess 150 proximate the first arm 142. Bias device 154 is fully compressed. The actuator 36 has moved slightly clockwise about pivot 40 such that slider 30 is now positioned over takeoff/landing zone 102. Although the force exerted by actuator 36 is sufficient to displace bias device 154, it is still less than the force required to overcome the magnetic attraction between magnetic post 164 and plate 160. Thus, latch member 130 remains in place.

When it is desired to position slider 30 over data zone 104, actuator 36 is energized such that it exerts a force against the side of recess 150 adjacent leg 142 sufficient to overcome the magnetic attraction between plate 160 and magnetic post 164. The latch 130 then rotates in a counter clockwise direction and the tab 152 is freed from recess 150. The actuator 36 is then free to pivot in a clockwise direction about axis 40, such that slider 30 is positioned over data zone 104.

Figure 5:
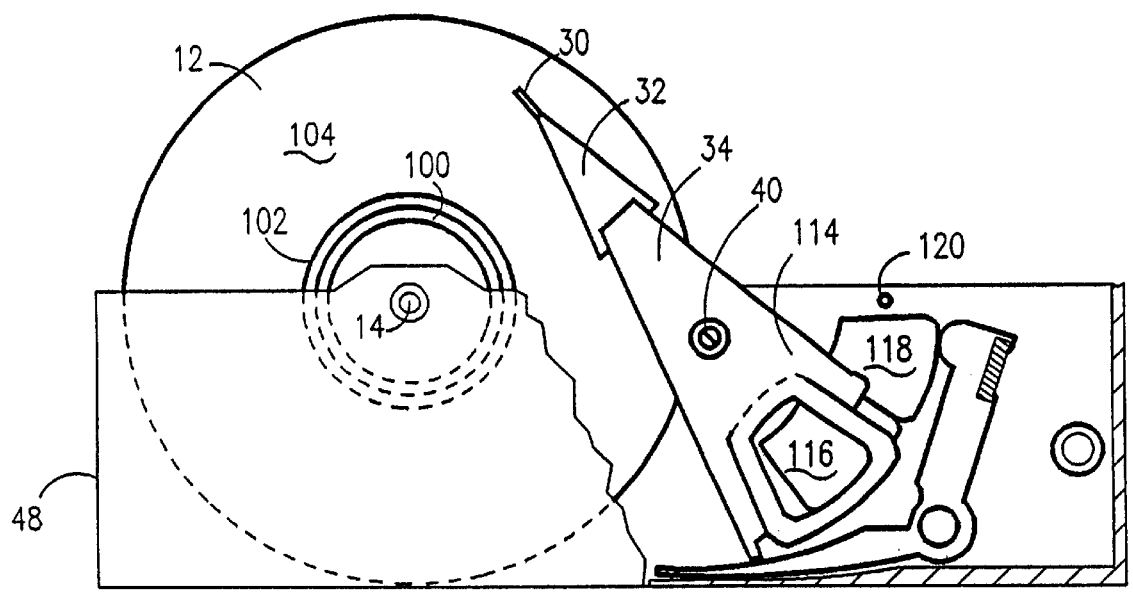
FIG. 5 is a cutaway top view of the. system of FIG. 1 in a normal operating position.
Figure 6:
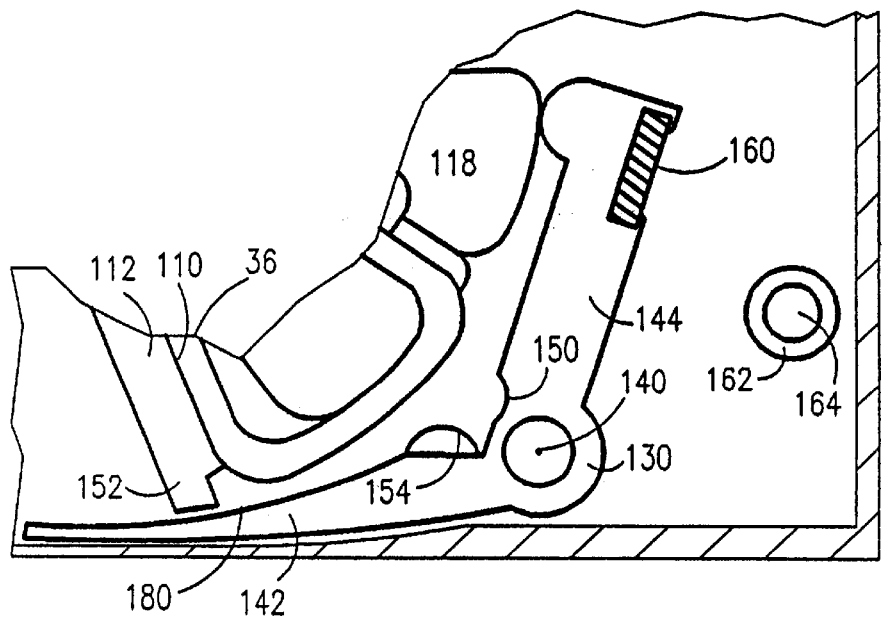
FIG. 6 is a closeup view of a latch portion of FIG. 5 in a normal operating position.

FIGS. 5 and 6 show the system 10 with the slider 30 positioned over data zone 104. When tab 152 is freed from recess 150, it moves along an arcuate surface 180 of leg 142. This ensures that latch 130 is rotated in a counter clockwise direction until leg 142 abuts the inside surface of housing 48. At the same time, plate 160 is attracted to magnetic 118 such that leg 144 abuts magnetic 118 and latch 30 will remain in the open position. This ensures that latch 130 will not interfere with the movement of actuator 36 when the drive is in normal operation reading and/or writing data from or to the data zone 104. The actuator 36 is free to move slider 30 anywhere about data zone 104.

When it is desired to latch the actuator 36, the actuator 36 is rotated counter clockwise about axis 40 until tab 152 engages the side of recess 150 proximate leg 144. The actuator then provides a force sufficient to overcome the attractive force plate 160 and magnet 118. The latch 130 rotates clockwise and completely captures tab 152 in recess 150. Plate 160 then engages bumper 162 as it is attracted to magnetic post 164. A discussion of alternative latch embodiments which may also be used in the present invention is given in U.S. Pat. No. 5,363,261 issued Nov. 8, 1994 to Eckberg et al., and is hereby incorporated by reference.

Figure 7:
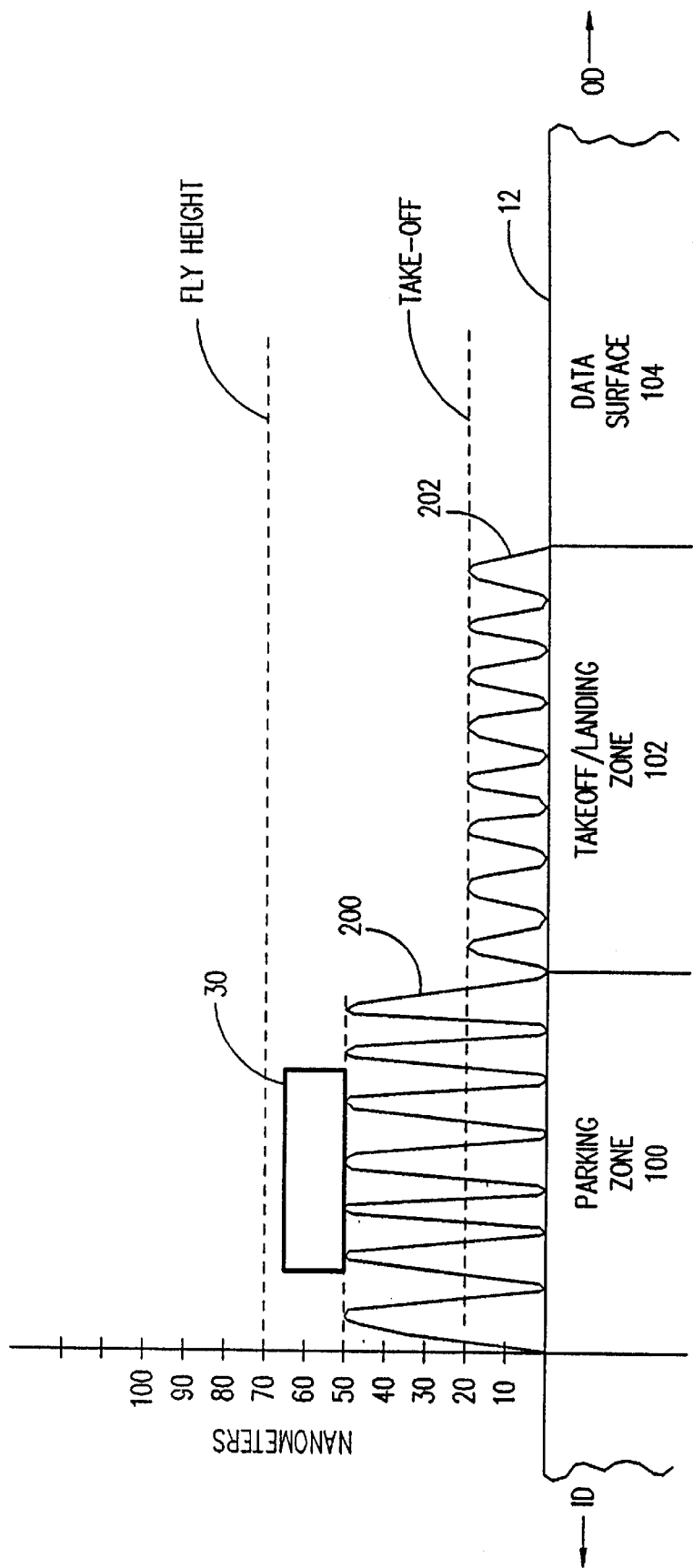
FIG. 7 is a cross-sectional view of the disk of FIG. 1.

FIG. 7 shows a cross-sectional view of disk 12. Disk 12 comprises a substrate having a number of overcoat layers, including the magnetic recording layer. Before the overcoat layers are deposited, the parking zone 100 and takeoff/landing zone 102 are textured. Parking zone 100 has relatively large peaks (bumps) 200 and takeoff/landing zone 102 has smaller height peaks (bumps) 202. The peaks 200 and 202 are formed using a laser texturing process such as that described in U.S. Pat. No. 5,062,021 issued Oct. 29, 1991 to Ranjan et al., and IBM's copending patent application Ser. No. 08/150,525. Other texturing processes may also be used to form the peaks 200 and 202. These processes include mechanical grinding of the surfaces or photolithographic etching of the surfaces.

In a preferred embodiment the laser texturing process is used. The process forms a number of individual bumps each of which is formed by a single laser pulse. The bumps can be formed with a diameter in the range of approximately 5–30 microns. The bumps have an average spacing or separation in the range of approximately 25–100 microns, depending on the disk rotation rate and laser pulse rate used during the texturing process.

In the preferred embodiment, peaks 200 for parking zone 100 are of a height between 20 and 80 nm and preferably 50 nm for a drive system where the flying height is between 40 and 70 nm. The height distance refers to the vertical distance between the peaks (top of the bumps) and the surrounding disk surface. For future systems with low flying heights or zero average flying height (contact recording), the peaks 200 for parking zone 100 may be of a height between 10 and 80 nm and preferably 40 nm. In all cases, the fundamental concept in determining the height for peaks 200 for parking zone 100 is to optimize the peak heights to prevent stiction while the disk is at rest and to minimize the wear of the disk surface and damage to the slider during the brief period the slider is located in this zone while the disk is rotating.

In a preferred embodiment, the peaks 202 of takeoff/landing zone 102 are of a height between 10 and 50 nm and preferably 20 nm for a drive system with a flying height of between 40 and 70 nm. For future systems with lower flying heights or zero average flying height, the peaks 202 for takeoff/landing zone 102 are of a height between 5 and 40 nm and preferably 20 nm. In all cases the fundamental concept for determining the height of peaks 202 takeoff/landing zone 102 is to optimize the peaks to prevent instantaneous stiction (the case where the slider seizes and sticks to the rotating disk) between the slider and disk and to minimize wear of the disk and slider when the slider is in contact with a rotating disk.

The surface of data zone 104 is polished to a very smooth finish. The data zone 104 may have some very small surface variations. However, these variations are typically less than 5 nm and have very gentle slopes.

The width of zones 100 and 102 should be at least equal to the width of the slider 30 such that slider 30 is able to be completely contained within each zone. This is necessary to ensure that stiction will not occur. In a preferred embodiment, the width of zones 100 and 102 are substantially equal to 1.5 times the slider width. Thus,.widths of 100 and 102 should be 1.5 mm for a 1.0 mm width slider.

Figure 8:
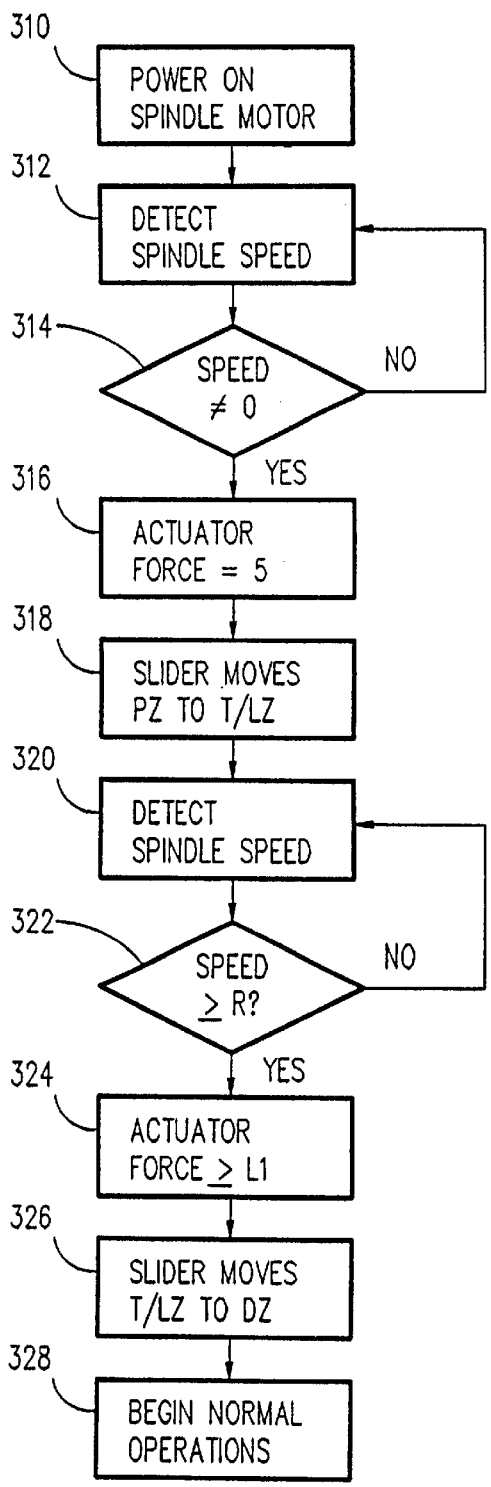
FIG. 8 is a flowchart diagram of a slider takeoff process.

FIG. 8 shows a flowchart diagram of a takeoff process for the system 10 and is designated by the general reference number 300. This process may be implemented in hardware or software in the controller unit 50. Initially, the spindle motor 16 and actuator 36 are powered off and the slider 30 is at rest on the surface of parking zone 100. At a step 310, the spindle motor 16 is turned on and the disk 12 begins to rotate. Peaks 200 of parking zone 100 are of a height optimized for holding a slider at rest and are not designed for extending periods of contact with a moving slider. It is important to move the slider off of zone 100 as soon as rotation is detected.

At a step 312, the spindle speed is detected by checking speed sensor 61 of speed control/driver 60. At a step 314, it is determined if the speed is non-zero. If yes, the process proceeds to a step 316 and if not, it returns to step 312.

At step 316, the actuator 36 is energized such that it exerts a force equal to S against the bias device 154 on the side of recess 150 proximate leg 142. The force S is great enough to ensure that tab 152 displaces bias device 154. When this happens, at a step 318, the actuator rotates slightly clockwise and slider 30 is moved from the parking zone 100 to the takeoff/landing zone 102. The force S is less than the force required to overcome the attractive force between plate 160 and magnetic post 164 (the force required to unlatch latch 130).

At this point, the rotational speed of the disk is increasing. The slider 30 is still in contact with the disk 12 at the takeoff/landing zone 102, but will become fully airborne sometime before the disk reaches full operational speed. The peaks 202 of zone 102 are optimized for preventing instantaneous stiction between the slider and disk and minimizing wear of the disk and slider when the slider is in contact with a rotating disk. actuator tab 152 is still inside recess 150 of latch 130. If there were to be a power disruption at this point, the spindle speed would slow to a stop and the actuator power would go off. The bias spring 154 would push tab 152 such that slider 30 returns to the parking zone 100. This automatic return to parking zone 100 ensures that the slider 30 will not encounter stiction problems even in an emergency power failure. However, once the actuator is unlatched, the slider 30 will be over the smooth data zone 104 where stiction is a very big problem. To avoid stiction in zone 104, the slider 30 must be fully airborne when it exits zone 102 to data zone 104. The slider 30 will be fully airborne when disk 12 is rotating at a speed known as the release speed (R).

At a step 320, the spindle speed is detected and at a step 322, it is determined if the speed: is greater or equal to R (release speed). In the preferred embodiment, release speed may be between 1800 RPM and top speed (greater than 7200 RPM) and preferably at top speed. Disk drives typically use the back EMF generated by a rotating spindle motor to power the actuator motor to return the slider to the parking zone in the event of a power failure. The amount of back EMF generated by the spindle motor will depend upon the disk rotational speed when the power is cut off. Therefore, in order to insure against a power failure situation, it is desirable not to release the slider from the latch position until there is sufficient disk rotation such that if there is a power failure, there is enough back EMF to return the actuator to the latch position and the slider to the parking zone. However, if this safety feature is not implemented, the latch may be released any time after the slider becomes airborne in the takeoff/landing zone.

At a step 324, the tab 152 of actuator 36 exerts a force greater or equal to L1 against bias device 154 on the side of recess 150 proximate leg 142. This force L1 is sufficient to overcome the attractive force between plate 160 and magnetic post 164 (the force required to unlatch latch 130). The latch 130 will rotate counter clockwise and release tab 152 from recess 150 such that actuator 36 is free to rotate clockwise. Latch 130 will then rotate until leg 144 engages magnet 118 and latch 130 will remain in this position because of the attraction between plate 160 and magnet 118.

At a step 326, the actuator 36 moves slider 30 from the takeoff/landing zone 102 to the data zone 104. At a step 328, the system begins normal operation with the actuator 36 moving slider 30 with the transducer to the desired tracks in zone 104 where data is to be read and/or written.

An alternative embodiment of the takeoff process 300 would be to move the slider from the parking zone 100 to the takeoff/landing zone 102 prior to the time the spindle motor is on. In such a case, steps 312 and 314 may be deleted and step 310 would follow step 316.

Figure 9:
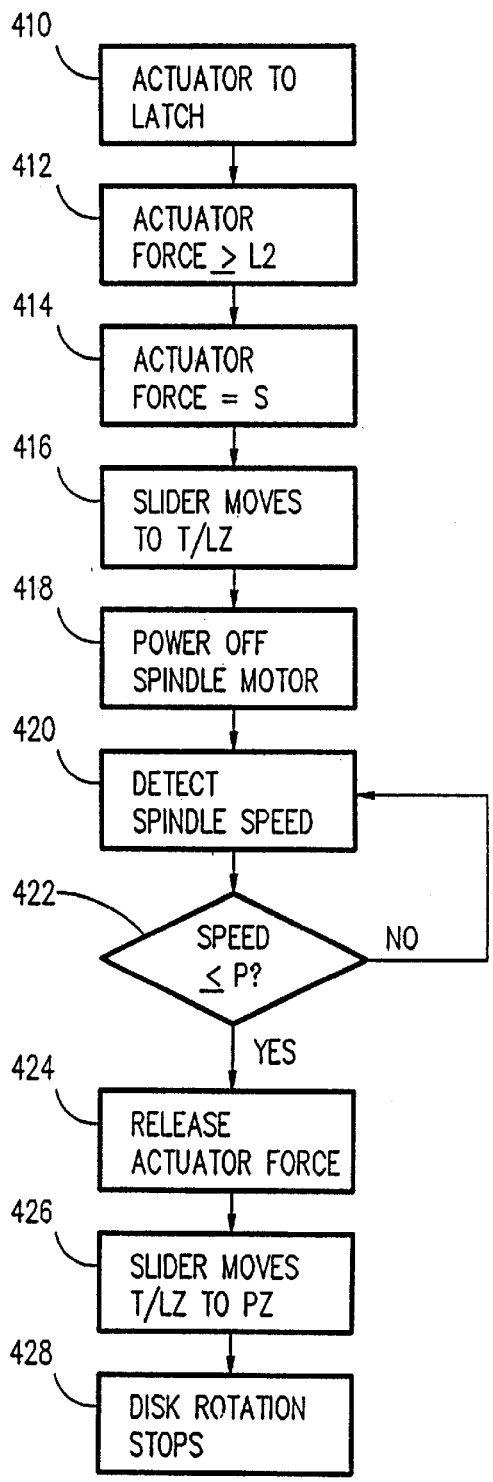
FIG. 9 is a flowchart diagram of a slider landing process.

FIG. 9 shows a flowchart diagram of a landing process for the system 10 and is designated by the general reference number 400. Process 400 may also be implemented in hardware or software in controller unit 50. Initially, the system 10 is in normal operating mode, the spindle motor 16 is rotating disk 12 at full operating speed and the slider 30 is fully airborne over data zone 104. At a step 410, the actuator 36 rotates in a counter clockwise direction until tab 152 contacts the wall of recess 150 proximate leg 144. At a step 412, the tab 152 of actuator 36 exerts a force greater or equal to L2 against the side of recess 150 proximate leg 144. This force L2 is sufficient to overcome the attractive force between plate 160 and magnet 118 (the force required to latch the latch 130). Latch 130 then rotates clockwise and captures tab 152 in recess 150. Plate 160 is then attracted to and contacts bumper 162 of post 164. When the actuator is initially latched and before the actuator is energized against the bias device 154, the slider 30 will be positioned over the parking zone 100. However, this is not a problem, because the disk is still rotating at full operational speed and the slider is fully airborne and does not contact the peaks 200 of parking zone 100. Even if there is contact, this is a problem because the duration of any contact between the slider and the bump peaks will be very short.

At a step 414, the actuator 36 is energized such that tab 152 exerts a force equal to S against the bias device 154. This causes bias device 154 to displace and actuator 36 rotates slightly clockwise. This results in slider 30 moving over the takeoff/landing zone 102 at a step 416.

Next, at a step 418, the spindle motor 16 is powered off and the disk rotation begins to slow. At a step 420, the spindle speed is detected and at a step 422 it is determined if the speed is less than or equal to P. If yes, the process proceeds to a step 424 and if not, it returns to step 420. The speed P should be that speed at which the disk is still rotating and will continue to rotate for a time sufficient to move slider 30 to parking zone 100. In the preferred embodiment, $0 \leq P < 500$ RPM, and P is preferably 100 RPM.

At a step 424, the actuator 36 is powered down and bias device 154 presses tab 152 back against the side of recess 150 adjacent leg 144. At a step 426, the slider 30 moves from takeoff/landing zone 102 to the parking zone 100. At a step 428, the disk stops rotating and slider 30 is at rest in parking zone 100.

Figure 10:
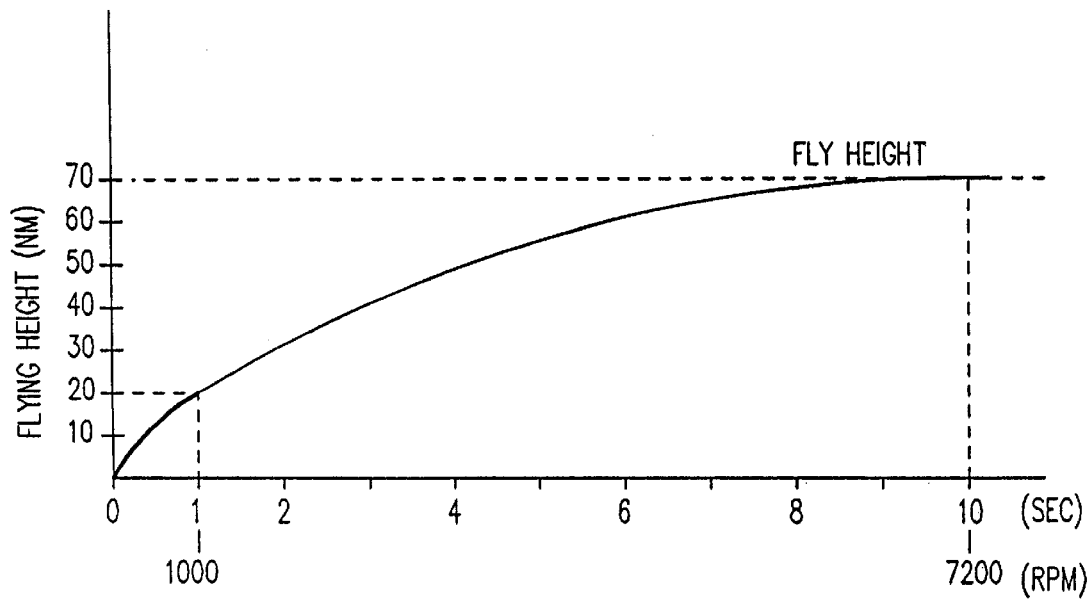
FIG. 10 is a graph of slider fly height vs. disk speed and time.

The takeoff and landing processes described above uses the detection of the spindle speed to determine the movements between various zones. However, timing could also be used rather than detection of the spindle speed. In this alternative case, the timing device 51 in the control unit 50 detects the passage of a certain amount of time after the disk is powered on or powered off. These time periods are determined by the particular acceleration or deceleration of the spindle motor such that the movement of the slider between the various zones will occur at spindle speeds equivalent to those described above. FIG. 10 shows a graph of slider flying height versus time and disk rotational speed for the preferred embodiment which has a flying height of 70 nm.

The processes 300 and 400 may be modified if the alternative embodiment using the timing device is used instead of the spindle speed detection. In this case, steps involving the detection of the passage of time periods is used to replace the detection of the spindle speeds at steps 312–314, 320–322, and 420–422. The rest of the process steps remain the same.

Figure 11:
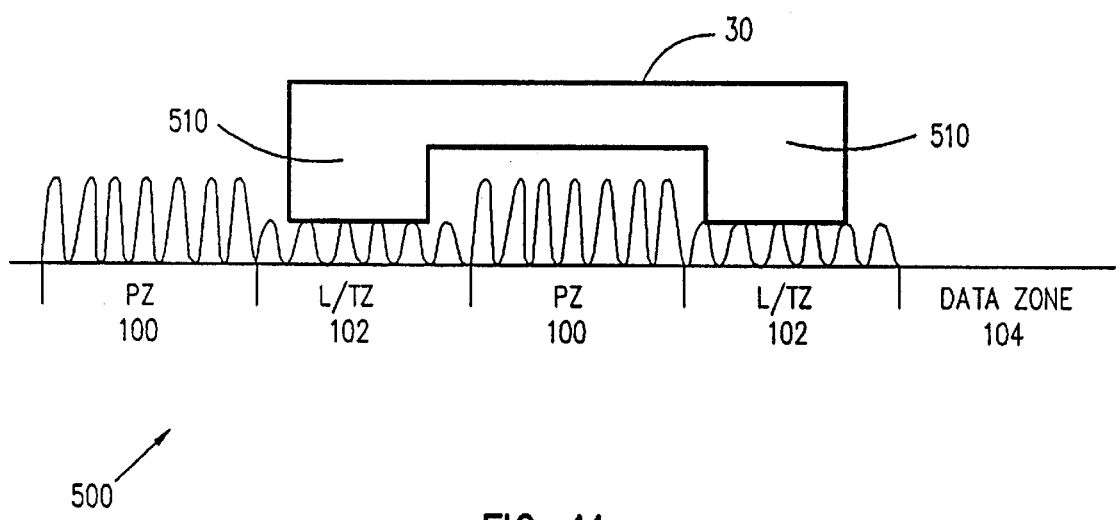
FIG. 11 is a cross-sectional view of an alternative embodiment of the present invention.

FIG. 11 shows a cross-sectional view of an alternative embodiment of the present invention which is designated by the general reference number 500. In embodiment 500, the parking zone 100 and the landing/takeoff zone 102 are interleaved with each zone having two noncontiguous portions each separated by a portion from the other zone. The slider 30 has parallel air bearing rails 510 which extend along either side of the bottom of the slider 30. The use of these air bearing rails is well known in the art. The widths of the portions of the zones are such that they are equal or greater than the widths of the side rails and less than the distance between the two rails. Since the slider 30 contacts the disk surface with only the side rails 510, it is possible for the slider to straddle the intervening zone. By interleaving the zones the overall width of the textured zones may be reduced. The operation of the disk drive is otherwise the same as that described above.

Other alternative embodiments of the present invention are also possible. For example, the texturing of the takeoff/landing zone 102 may be omitted such that this zone has the same smooth surface as the data zone 104. In this case, the slider would remain over the parking zone 100 until just after it has become airborne and then move to the takeoff/landing zone 102. It then remains in the landing/takeoff zone 102 until the disk reaches release speed. At that time, the latch may be released and the slider allowed to move out over the data zone 104. In this embodiment, it is possible to record data in the landing/takeoff zone which may be read as the disk is reaching full operational speed. The disadvantage of this embodiment is that it does create a slightly increased amount of wear on the parking zone since the slider must remain on the parking zone for a longer period of time.

The advantages of the present invention may now be understood. The present invention uses a multiple zone disk with each zone optimized for its particular purpose. The parking zone has a very rough texturing which is optimized for preventing stiction between a non-moving slider and the disk surface. The takeoff/landing zone has a slightly (intermediate) textured surface which is optimized for preventing instantaneous stiction, between a moving slider and disk and for minimizing wear of the disk surface and the slider. Since the slider is immediately moved off of the parking zone as the disk starts rotating, wear between the slider and the parking zone texturing is greatly reduced. This prevents the texturing of the parking zone from being worn down and also prevents damage occurring to the transducer due to the wear between the surfaces.

Another advantage of the present invention is that it teaches a way to precisely position a slider between a parking zone and a takeoff/landing zone. These textured zones do not need to have data and positioning information recorded onto them. When the slider is over the data zone, it has positioning information recorded on the data tracks to help it to determine its position. When the slider is in the parking zone and takeoff/landing zone, the system does not need to read positioning information from the disk. The latch mechanism ensures that the slider will be positioned in the two zones and bias device in the latch ensures in which of the two zones the slider will be located. If the actuator is latched and no actuator force is exerted, the slider is biased by the bias device into the parking zone. Conversely, if the actuator is in the latch position and the actuator is energized to a certain energy equal to S, the slider will be in the takeoff/landing zone. This device is fault tolerant since if there is a power disruption and the actuator is powered off, the bias device automatically ensures that the slider will be pushed back to the parking zone and no stiction will occur between the slider and the disk. Also, any rotary shock below the threshold of which the actuator becomes unlatched will move the actuator instantly against the bias spring, but the. bias spring will force the actuator back into the parking zone.

Another advantage of the present invention is that it increases the tolerance of the drive to external shocks. Disk drives are fragile when being transported and the primary reason is that if you drop the drive, the heads lift off the disk and then bang into them. The head is made of a much harder material than the disk and this creates disk damage sites that protrude out of the disk surface. If you take off and land on a surface with this protruding damage, the head will be more prone to crashing. With the present invention, any head slap damage to the disk is confined to the parking zone. This damage will not hurt stiction performance. When the drive spins up or down, the heads move to the undamaged takeoff/landing zone.

While the preferred embodiments of the present invention have been illustrated in detail, it should be apparent that modifications and adaptions to those embodiments may occur to one skilled in the art without departing from the scope of the present invention as set forth in the following claims.

What is claimed is:

1. A data storage system comprising:
   a magnetic recording disk;
   a transducer assembly located proximate to the disk;
   a spindle motor for rotating the disk relative to the transducer assembly;
   an actuator connected to the transducer assembly for moving the transducer assembly relative to the disk; and
   a latch device for engaging the actuator such that the actuator movement is limited, the latch device having a bias device for biasing the actuator at a parking position when the actuator is not energized and allowing the actuator to move to a takeoff position when the actuator is energized.

2. The system of claim 1, wherein the actuator is a rotary actuator having an engagement tab, and the latch comprises a pivotally mounted member having a recess for engaging the tab.

3. The system of claim 1, wherein the bias device is located within the recess.

4. The system of claim 3, wherein the bias device is a leafspring.

5. The system of claim 1, further comprising a magnetic device for holding the latch in a position engaging the actuator.

6. A disk drive comprising:
   a magnetic recording disk;
   a transducer assembly;
   a spindle motor for rotating the disk relative to the transducer assembly;
   an actuator connected to the transducer assembly for moving the transducer assembly relative to the disk when energized; and
   a latch which is pivotally mounted to rotate between latched and unlatched positions and engages the actuator when in the latched position with a resilient bias device urging the actuator against a nonresilient member positioning the transducer assembly over a parking position when the actuator is not energized.

7. The disk drive of claim 6 further comprising:
   means for limiting the rotation of the latch at the latched position; and means for exerting an attractive force on the latch in the latched position.

8. The disk drive of claim 6 wherein a force applied to the actuator in the latched position displaces the resilient bias device allowing the actuator to move to a takeoff position before overcoming the attractive force freeing the latch to rotate to the unlatched position.

9. The disk drive of claim 7 wherein the means for limiting the rotation of the latch is a rubber bumper.

10. The disk drive of claim 7 wherein the means for exerting an attractive force is a magnet.

11. The disk drive of claim 6 wherein the bias device is a leafspring.

12. The disk drive of claim 6 wherein the actuator moves in an arcuate path and near an extreme end of the path engages the nonresilient member causing the latch to rotate into the latched position.

* * * * *